June 2, 1964  T. J. NEWMAN ETAL  3,135,053
TRACKING PREDICTING SYSTEMS
Filed Oct. 16, 1956  2 Sheets-Sheet 1

INVENTORS.
THEODORE J. NEWMAN
RICHARD Y. MINER
BY Raymond A. Paquin
ATTORNEY.

INVENTORS.
THEODORE J. NEWMAN
RICHARD Y. MINER

BY
ATTORNEY.

United States Patent Office 3,135,053
Patented June 2, 1964

3,135,053
TRACKING PREDICTING SYSTEMS
Theodore J. Newman, Forest Hills, and Richard Y. Miner,
Port Washington, N.Y., assignors to American Bosch
Arma Corporation, a corporation of New York
Filed Oct. 16, 1956, Ser. No. 616,295
3 Claims. (Cl. 33—49)

The present invention relates to ordnance fire control systems and has particular reference to improvements in the tracking-predicting apparatus of disturbed line-of-sight systems.

Prior tracking-predicting systems of the type described herein are generally known. However, they require an extremely high quality predicted-line servo for satisfactory operation. The present invention is a modification of the generally known system whereby improved operation can be obtained with a predicted line servo of less than superior quality.

In the usual system, a tracking error is effective in controlling a predicted line servo to reduce the tracking error and also to produce a lead angle between the predicted and tracking lines by controlling a lead angle computer which controls the tracking line servo so as to drive it (in a direction opposite to the target motion) out of alignment with the predicted line servo by an angle equal to the desired lead angle.

The present invention contemplates using the positional error of the predicted line servo to modify the tracking error, so that the modified tracking error is equivalent to the tracking error which would be obtained if the predicted line servo were perfect, thereby improving the stability and performance of the fire control system.

This will make the tracking error information which is fed to the system act as if there were no additional tracking error caused by the imperfections of the predicted line servo, resulting in a system which is non-oscillatory and smooth in operation.

For a more complete understanding of the invention, reference may be had to the accompanying diagrams, in which, FIG. 1 is a plan view of the fire control problem involved;

Figure 1:
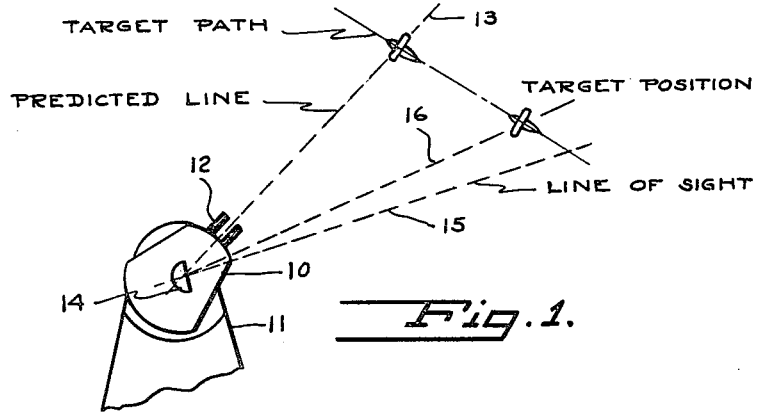

FIG. 1 shows the general arrangement of the tail armament of an aircraft, in plan view, and illustrates the fire control problem involved. The platform or gun turret 10 is mounted on an aircraft 11 and is adapted to be rotated in azimuth and elevation to position the guns 12 according to a predicted target position 13. The platform or gun turret 10 also carries a target sensing instrument 14 for establishing a line of sight 15. The target sensor 14 may be a radar antenna for example, which is rotatable in both azimuth and elevation with respect to the turret 10. The tracking error angle is the angle between the line-of-sight, or tracking line 15 and the target position 16. Since the antenna which establishes the line of sight 15 is carried by the turret 10, the system is known as a disturbed line-of-sight tracking system.

In a tracking-predictor system the guns 12 are directed along a predicted line 13 which leads the target position 16 by an angle which is continuously determined from previous tracking of the target.

Although FIG. 1 shows the problem only in plan, it should be realized that the same problem exists in elevation as well, and may be solved in a manner similar to that which will be described.

Figure 3:
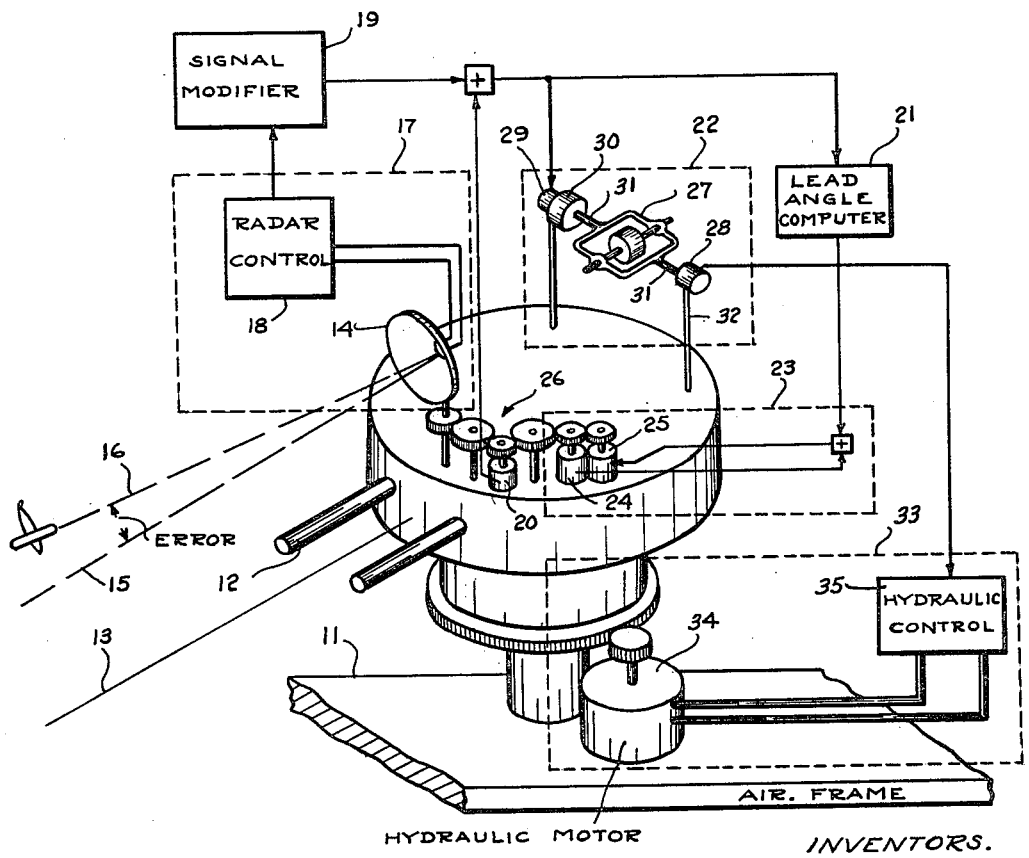
FIG. 3 is a pictorial representation of a particular embodiment of FIG. 2.
Figure 2:
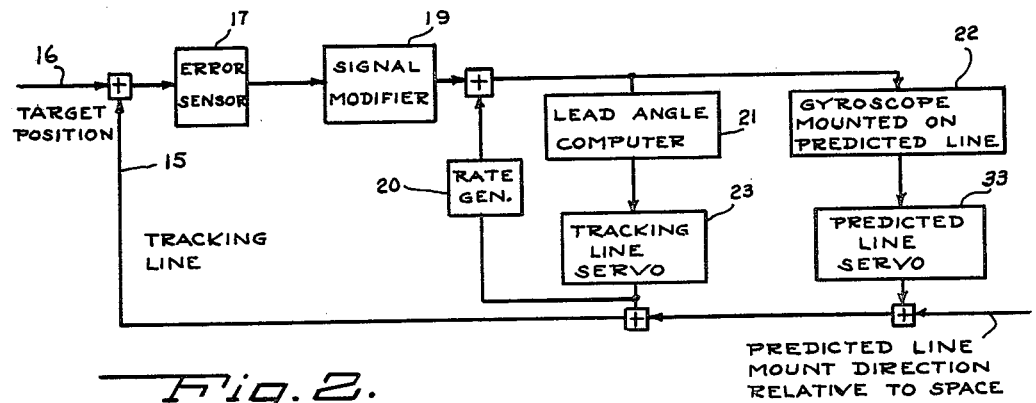
FIG. 2 is a schematic diagram of the known tracking and predicting system.

FIGS. 2 and 3 of the drawings show in block diagram and schematic representation the present instrumentation of the fire control problem, and the preferred embodiment of the apparatus for performing this instrumentation.

Referring now to FIGS. 2 and 3, the difference between the tracking line 15 and target position 16, i.e., the tracking error, is sensed by the error sensor 17 which includes the radar antenna 14 and the radar control 18 to produce an output signal in the error sensor proportional in magnitude to the tracking error angle. Other types of error sensors may be employed, such as manually operated optical tracking apparatus, for example, which will produce a similar signal.

The output of the error sensor 17 is applied to the signal modifier 19 which produces an output signal proportional to the sum of the error signal and the time integral of the error signal. This modification of the error signal is required in order to provide "aided tracking" which substantially eliminates the velocity lag between the tracking line 15 and the target position 16 which results when the turret initially begins to drive the antenna towards the target and before the rate of driving the antenna is sufficient to keep it on the target.

The signal from a rate generator 20, which supplies a signal proportional to the time rate of change of lead angle $$\frac{dp}{dt}$$

as will be described, is added to the output of the signal modifier 19, and the total voltage is applied to the lead angle computer 21 and to the angular motion control such as an integrating gyro 22 mounted on the turret 10. The lead angle computer 21 determines a lead angle according to the relative motion of the target with respect to the aircraft and the ballistics of the weapon. The lead angle computer solves the equation $$p = S\left(W - k\frac{dp}{dt}\right) + C \qquad (1)$$

where
p is the lead angle,
C is the ballistic curvature angle,
$\frac{dp}{dt}$ is the time rate of change of lead angle,
S is so called "Sensitivity" which depends on range, range rate, etc.,
W is the rate of turret rotation, and
k is a constant which include weapon ballistics and stability considerations.

The output of the lead angle computer 21 controls the displacement of the antenna 14 with respect to the turret 10 by means of the tracking line servo 23 which drives the antenna 14 through gearing 26. The servo 23 includes a potentiometer or the equivalent 24 and a motor 25 which controls the potentiometer 24 and is in turn controlled by the difference between the outputs of the potentiometer 24 and the lead angle computer 21. Thus, when the signal to the motor 25 is zero the displacement of potentiometer 24 and therefore of antenna 14 with respect to the turret 10 is equal to the desired lead angle. Also driven by the motor 25 is the rotor of a generator 20. Since the displacement of motor 25 is proportional to the lead angle, the output of the generator 20 is proportional to the time rate of change of lead angle $$\frac{dp}{dt}$$

In response to an error signal from the error sensor 17, the tracking line servo drives the antenna in a direction tending to increase the tracking error angle. The function of the generator 20 is to drive the turret in a direction opposite to that of the antenna so that the tracking error angle is not increased.

Referring particularly to FIG. 3 it will be seen how the tracking line or radar antenna 14 is mounted on the predicted line or turret 10 which is mounted on the frame of the aircraft 11.

The turret 10 also carries the integrating gyro 22 which contains a single degree of freedom gyroscope 27 with a pickoff device 28, a torque motor 29 and a viscous damper 30 connected between the output shafts 31 of the gyroscope 27 and the supports 32 which are connected to the turret 10. The integrating gyro 22 is a well-known device which responds to rotation about an axis, known as the input axis, which is mutually perpendicular to the spin axis of the gyroscope 27 and the output axis through the shafts 31 by precession about the output axis. The resulting precession is sensed by the pickoff device 28 and a voltage is produced in the pickoff device 28 which is proportional to the amount of turn of turret 10 about the input axis.

In order to cause the turret 10 to rotate at a given rate the torque motor 29 of the integrating gyro 22 is energized by a voltage proportional to the desired rate of rotation. The pickoff 28 is therefore displaced by the torque motor 29 to produce a voltage which is applied to the predicted line servo 33 which drives the turret 10 at a rate proportional to the strength of its signal input. The predicted line servo 33 is preferably a hydraulic servo which includes a hydraulic motor 34 operatively connected to the turret 10 and a hydraulic control 35 actuated by the input signal from the pickoff device 28. Rotation of the turret 10 causes the gyroscope 27 to apply a counter torque to the shaft 31 opposing the torque of motor 29. When these torques are equal, the pickoff output will be zero, the desired rate being held by the "memory" feature of the hydraulic control 35 and the turret 10 will be rotating at the desired rate.

It will be seen that the integrating gyro 22 also assists in stabilizing the turret 10. For example, whenever the airframe 11 rotates in space, tending to carry the turret 10 with it, the gyroscope 27 is displaced and the predicted line servo 33 is energized to drive the turret 10 in a direction to reduce the displacement of gyroscope 27. When the output of pickoff device 28 is zero, the turret has been returned to its original direction in space.

To summarize the operation of the tracking system assume first that the tracking line 15, predicted line 13 and target position 16 are all the same.

As the target moves away from the tracking line 15 the tracking error sensor 17 produces a signal indicative of the angle between the line to the target 16 and the tracking line 15 which causes the turret 10 to be driven by motor 33 to reduce this error by causing the tracking line 15 to approach the target. At the same time the lead angle computer 21 determines a lead angle which energizes the tracking line servo 23, causes motor 25 to drive the antenna 14 and thereby to drive the tracking line 15 away from the predicted line 13 and the target line 16, thereby producing an angle between the tracking line 15 and the predicted line 13. The rate at which the turret 10 is driven is dependent on the combined error signal, from the signal modifier 19, and the signal from rate generator 20 which is proportional to the rate of antenna motion. When the turret rate is sufficient to keep the antenna on the target, the angle between the gun line and the tracking line is equal to the predicted angle, $p$.

For stability reasons the response of the tracking line servo 23 is made slower than that of the predicted line servo 33 whereby the turret 10 begins to move before the antenna 14. The rate of change of prediction angle signal $$\frac{dp}{dt}$$

which is fed back to the output of the signal modifier assists in stabilizng the dynamic operation of the tracking system by making the tracking loop independent of prediction computer dynamics.

During the operation of a practical system such as described above, it has been found that an extremely high speed response predicted line servo 33 is required. The present invention eliminates the necessity of this extremely fast response and allows satisfactory operation of the tracking system with a predicted line servo of less than superior quality.

In accordance with this invention the output of the pickoff device 28 is introduced into the tracking loop at a point such that the signal output of the pickoff 28 tends to cause the tracking line to appear to the system to be the same as if the output of the pickoff 28 were zero, i.e., the same as if the predicted line servo 33 were perfect.

Figure 4:
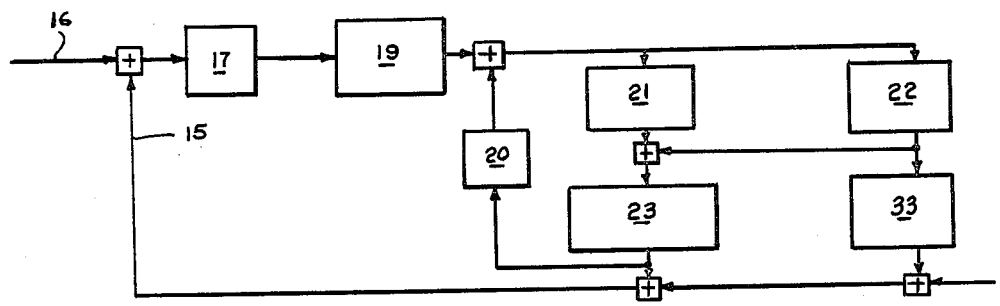
FIG. 4 is one method of applying the invention to the circuit of FIG. 2.

FIG. 4 shows one method of accomplishing this result. The output signal of pickoff 28 of the integrating gyro 22 is applied to the tracking line servo 23 directly with the output of the lead angle computer 21. Suppose now that at any given instant the gun servo 33 has not been able to reduce the gyroscope error to zero leaving an error output from pickoff 28. Then there is a similar tracking error signal from the error sensor 17 since for perfect servo operation the tracking error would be zero. However, the effect of the tracking error signal (caused by the imperfect servo 33) on the system will be nullified by the signal from pickoff 28 acting on the tracking line servo 23. The output of pickoff device 28 however, will continue to cause the turret 10 to be driven until the tracking line error is zero.

Figure 5:
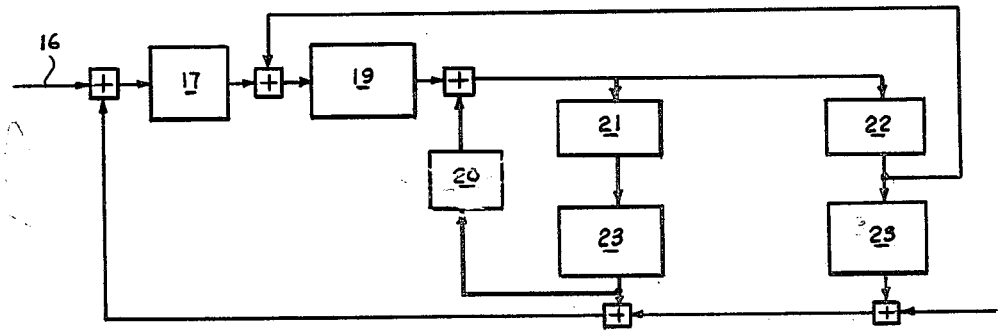
FIG. 5 is another method of applying the invention to the circuit of FIG. 2.

An alternative method of accomplishing the same result is shown in FIG. 5. In this modification the output from pickoff 28 of integrating gyro 22 is subtracted from the output of the error sensor 17. Now assuming that the same situation exists, where the gun servo 33 has not been able to reduce the pickoff 28 output to zero the output of the pickoff 28 combined with the error sensor 17 output will make the signal to the signal modifier 19 equal to what it would be if the output of pickoff 28 were zero. Thus the signal to the signal modifier 19 acts as if the predicted line servo 33 responded with no error to the rate order signal to torque motor 29 even though the lag may be quite large. Therefore, the portions of the system which are actuated by the signal modifier 19 tend to behave as though the predicted line servo 33 were perfect although this is not so.

We claim:

1. In a device of the character described, a support, a platform carried by said support and mounted for rotation relative thereto, target sensing means including a radar antenna carried by said platform and mounted for rotation relative thereto, said target sensing means being directed along a line of sight and producing a signal indicative of the displacement of the target and said line of sight, angular motion control means including an integrating gyro carried by said platform and responsive to said target sensing means, motive means for driving said platform and energized by said angular control means, a lead angle computer responsive to the output of said target sensing means, second motive means for driving said target sensing means and energized by said lead angle computer, the output of said angular motion control means being connected to modify the energization of said second motive means.

2. The device of claim 1 in which signal modifying means is interposed between the output of said target sensing means and said lead angle computer and said angular motion control means.

3. In a device of the character described, a support, a platform carried by said support and mounted for rotation relative thereto, target sensing means including a radar antenna carried by said platform and mounted for rotation relative thereto, said target sensing means being directed along a line of sight and producing a signal indicative of the displacement of the target and said line of sight, angular motion control means including an integrating gyro carried by said platform and responsive to said target sensing means, motive means for driving said platform and energized by said angular control means, a lead angle computer responsive to the output of said target sensing means, second motive means for driving said target sensing means and energized by said lead angle computer, signal modifying means interposed between the output of said target sensing means and said lead angle computer and said angular motion control means, the output of said angular motion control means being connected to modify the signal to said signal modifying means.

References Cited in the file of this patent
UNITED STATES PATENTS

| | | |
|---|---|---|
| 2,660,793 | Holschuh | Dec. 1, 1953 |
| 2,705,371 | Hammond | Apr. 5, 1955 |
| 2,715,776 | Knowles et al. | Aug. 23, 1955 |
| 2,737,652 | White | Mar. 6, 1956 |
| 2,773,643 | Teiling | Dec. 11, 1956 |